United States Patent
Zhang

(10) Patent No.: US 10,520,665 B2
(45) Date of Patent: Dec. 31, 2019

(54) BACKLIGHT MODULE AND LIQUID CRYSTAL DISPLAY WITH THE SAME

(71) Applicant: Wuhan China Star Optoelectronics Technology Co., Ltd., Wuhan, Hubei (CN)

(72) Inventor: Wei Zhang, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 197 days.

(21) Appl. No.: 15/525,579

(22) PCT Filed: Mar. 31, 2017

(86) PCT No.: PCT/CN2017/078957
§ 371 (c)(1),
(2) Date: May 9, 2017

(87) PCT Pub. No.: WO2018/166001
PCT Pub. Date: Sep. 20, 2018

(65) Prior Publication Data
US 2018/0292602 A1     Oct. 11, 2018

(30) Foreign Application Priority Data
Mar. 13, 2017   (CN) .......................... 2017 1 0147786

(51) Int. Cl.
G02F 1/1335     (2006.01)
G02F 1/1333     (2006.01)
(Continued)

(52) U.S. Cl.
CPC ..... *G02B 6/0088* (2013.01); *G02F 1/133308* (2013.01); *G02F 1/133528* (2013.01);
(Continued)

(58) Field of Classification Search
None
See application file for complete search history.

(56) References Cited

U.S. PATENT DOCUMENTS

2004/0169809 A1* 9/2004 Yamabuchi ....... G02F 1/133351
349/153
2009/0237586 A1* 9/2009 Han .................. G02F 1/133308
349/58
(Continued)

FOREIGN PATENT DOCUMENTS

CN     102305982 A  *  1/2012   .............. F21V 17/00
CN     102305982 A     1/2012
(Continued)

*Primary Examiner* — Edward J Glick
*Assistant Examiner* — Anthony G Quash
(74) *Attorney, Agent, or Firm* — Andrew C. Cheng

(57) ABSTRACT

A backlight module includes a backboard, a light guide plate arranged on the backboard, an optical film arranged on the light guide plate, a frame fixed with the backboard and configured to fix the light guide plate and the optical film, and an inclined block arranged on an upper surface of the frame. A slant of the inclined block is smoothly connected to the upper surface of the frame. A liquid crystal display having the backlight module is also provided. The backlight module and the LCD including the backlight module supply the glue with wide and broad attaching space. It brings great convenience to processing and assembly of the glue, thereby saving time and costs.

8 Claims, 3 Drawing Sheets

(51) Int. Cl.
*G02F 1/16753* (2019.01)
*F21V 8/00* (2006.01)

(52) U.S. Cl.
CPC ............ *G02F 2001/133317* (2013.01); *G02F 2202/28* (2013.01)

(56) References Cited

U.S. PATENT DOCUMENTS

| | | | | |
|---|---|---|---|---|
| 2010/0039578 | A1* | 2/2010 | Roh | G02F 1/133604 349/58 |
| 2012/0162565 | A1* | 6/2012 | Lee | G02F 1/133308 349/58 |
| 2012/0257417 | A1* | 10/2012 | Lee | G02B 6/005 362/622 |
| 2012/0300154 | A1* | 11/2012 | Tanaka | G02B 6/0055 349/58 |
| 2013/0322113 | A1* | 12/2013 | Yang | G02B 6/0088 362/606 |
| 2015/0168640 | A1* | 6/2015 | Jeong | G02F 1/133308 349/58 |
| 2016/0245988 | A1* | 8/2016 | Sugimoto | G02B 6/0055 |
| 2016/0345446 | A1* | 11/2016 | Zhu | H01L 51/524 |
| 2016/0363718 | A1* | 12/2016 | Zhou | G02F 1/133308 |

FOREIGN PATENT DOCUMENTS

| | | | | |
|---|---|---|---|---|
| CN | 104534363 A | | 4/2015 | |
| CN | 205334013 U | * | 6/2016 | ......... G02F 1/13357 |
| CN | 104765196 A | | 7/2016 | |
| CN | 105929599 A | * | 9/2016 | ......... G02F 1/13357 |
| CN | 105929599 A | | 9/2016 | |
| JP | H11271719 A | | 10/1999 | |

* cited by examiner

BACKLIGHT MODULE AND LIQUID CRYSTAL DISPLAY WITH THE SAME

BACKGROUND

1. Field of the Disclosure

The present disclosure relates to a liquid crystal display, and more particularly, to a backlight module and a liquid crystal display (LCD) including the backlight module.

2. Description of the Related Art

With the progress of the photoelectrics and semiconductor technology, the flat-panel-display technology advances as well. Among a variety of flat panel displays, an LCD has become the mainstream product of the market owing to the advantages of high-space efficiency, low power consumption, no radiation, low electromagnetic interference (EMI), etc.

With the development of the LCD with an extremely narrow bezel, the width of the bezel becomes less and less, which causes troubles in processing and assembling glue attached to a frame, especially, in processing and assembling glue attached to a frame which no longer goes beyond the design of a liquid crystal panel. For example, the width of the frame is 0.6 millimeter (mm), and glue attached onto the frame is only 0.3 mm. The width of the glue is very hard to be processed and to be attached on the frame.

SUMMARY

To solve the problems occurring in the related art, an object of the present disclosure is to propose a backlight module which increases some attaching space for glue and a liquid crystal display (LCD) including the backlight module.

According to one aspect of the present disclosure, a backlight module includes a backboard, a light guide plate arranged on the backboard, an optical film arranged on the light guide plate, a frame, fixed with the backboard and configured to fix the light guide plate and the optical film, and an inclined block arranged on an upper surface of the frame. A slant of the inclined block is smoothly connected to the upper surface of the frame.

Furthermore, a bottom of the inclined block is shaped as a triangular prism as a right triangle. One leg surface of the inclined block is arranged on the upper surface of the frame. The other leg surface of the inclined block is parallel to an outer lateral side of the frame. The slant of the inclined block is a plane.

Furthermore, a bottom of the inclined block is shaped as a quasi-triangular prism as a quasi-right triangle. Two right-angle sides of the quasi-right triangle are straight edges. A hypotenuse of the quasi-right triangle is a curve edge; one leg surface of the inclined block is arranged on the upper surface of the frame. The other leg surface of the inclined block is parallel to an outer lateral side of the frame. The slant of the inclined block is a curve.

Furthermore, the inclined block and the frame are integrated.

Furthermore, an inner lateral side of the frame comprises a groove. The inner lateral side of the frame is attached to a lateral side of the light guide plate. A lateral side of the optical film is accommodated in the groove.

According to another aspect of the present disclosure, a liquid crystal display includes a liquid crystal display and a backlight module. The backlight module includes a backboard, a light guide plate arranged on the backboard, an optical film arranged on the light guide plate, a frame, fixed with the backboard and configured to fix the light guide plate and the optical film, and an inclined block arranged on an upper surface of the frame. A slant of the inclined block is smoothly connected to the upper surface of the frame. The liquid crystal panel includes an upper display substrate, a lower display substrate arranged with the upper display substrate, an upper polarizer arranged on an upper surface of the upper display substrate, and a lower polarizer arranged on a lower surface of the lower display substrate and the upper surface of the frame. A second slant is formed at a junction of the lower surface of the lower polarizer and a lateral surface of the lower polarizer, and the second slant and the first slant fit correspondingly.

Furthermore, a bottom of the inclined block is shaped as a triangular prism as a right triangle. One leg surface of the inclined block is arranged on the upper surface of the frame. The other leg surface of the inclined block is parallel to an outer lateral side of the frame. The slant of the inclined block is a plane.

Furthermore, a bottom of the inclined block is shaped as a quasi-triangular prism as a quasi-right triangle. Two right-angle sides of the quasi-right triangle are straight edges. A hypotenuse of the quasi-right triangle is a curve edge. One leg surface of the inclined block is arranged on the upper surface of the frame. The other leg surface of the inclined block is parallel to an outer lateral side of the frame. The slant of the inclined block is a curve.

Furthermore, glue is arranged between the first slant and the second slant and between the lower surface of the lower polarizer and the upper surface of the frame.

The backlight module and the LCD including the backlight module proposed by the present disclosure supply the glue with wide and broad attaching space. It brings great convenience to processing and assembly of the glue, thereby saving time and costs. It is the advantage of the present disclosure.

BRIEF DESCRIPTION OF THE DRAWINGS

The drawings illustrate embodiments of the invention and, together with the description, serve to explain the principles of the invention.

DETAILED DESCRIPTION OF THE PREFERRED EMBODIMENTS

Figure 1:
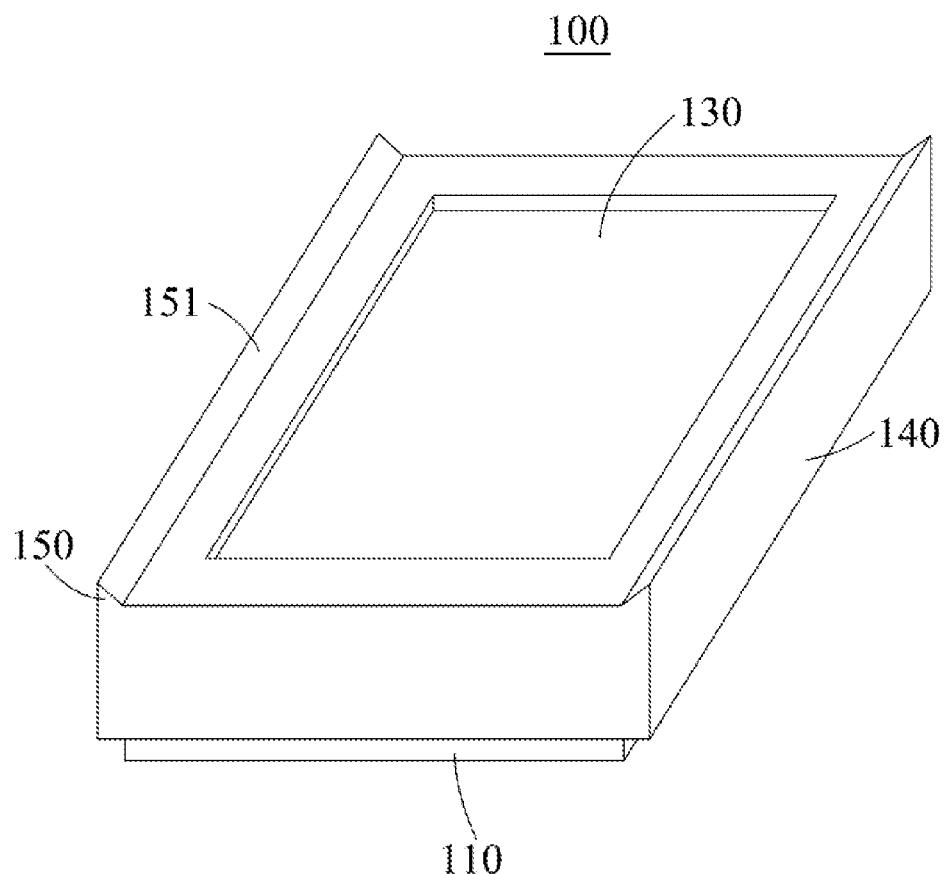
FIG. 1 illustrates a backlight module according to a first embodiment of the present disclosure.

The invention is described below in detail with reference to the accompanying drawings, wherein like reference numerals are used to identify like elements illustrated in one or more of the figures thereof, and in which exemplary embodiments of the invention are shown. This invention may, however, be embodied in many different forms and should not be construed as limited to the particular embodiments set forth herein. Rather, these embodiments are provided so that this disclosure will be thorough and complete, and will fully convey the scope of the invention to those skilled in the art.

In addition, in order to clarify the units, the thickness of areas and layers are larger than the actual size. In addition, the same numbers in the figures are used to represent the same units.

Figure 2:
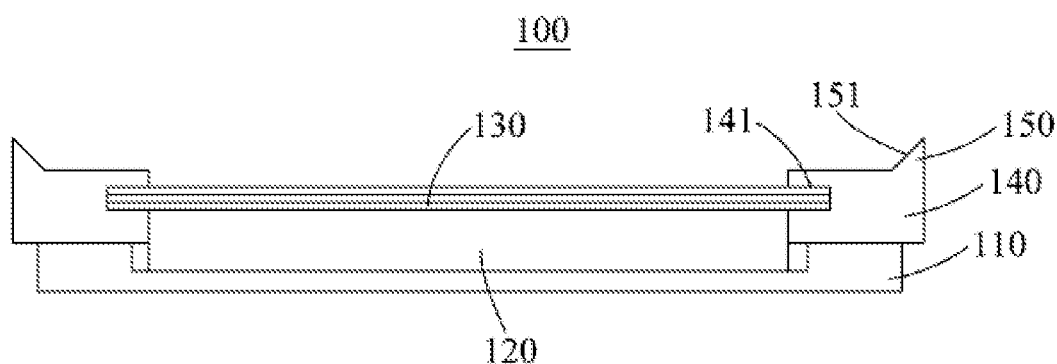
FIG. 2 illustrates a longitudinal sectional view of the backlight module according to this embodiment of the present disclosure.

Please refer to FIG. 1 and FIG. 2. FIG. 1 illustrates a backlight module according to a first embodiment of the present disclosure. FIG. 2 illustrates a longitudinal sectional view of the backlight module according to this embodiment of the present disclosure.

A backlight module 100 as shown in FIG. 1 and FIG. 2 includes a backboard 110, a light guide plate 120, an optical film 130, a frame 140, and an inclined block 150. A liquid crystal display 200 includes other crucial components such as a light source and a reflector.

The light guide plate 120 is loaded on the backboard 110. The optical film 130 is arranged on the light guide plate 120. The number of the optical film 130 is not limited though three optical films 130 are displayed in the present disclosure.

The frame 140 is formed by four sideboards. The four sideboards are connected end to end to form accommodation space. The frame 140 is arranged on the backboard 110 where the light guide plate 120 and the optical film 130 are accommodated in the accommodation space. The frame 140 and the backboard 110 are firmly fixed, and the light guide plate 120 and the optical film 130 are fixed in the accommodation space.

The light guide plate 120 and the optical film 130 are fixed in the accommodation space. Further, an inner lateral side of the frame 140 includes a groove 141. When the light guide plate 120 and the optical film 130 are accommodated in the accommodation space, the inner lateral side of the frame 140 and the lateral side of the light guide plate 120 are arranged opposite or the inner lateral side of the frame 140 is firmly attached to the lateral side of the light guide plate 120. The lateral side of the optical film 130 is accommodated in the groove 141. In this way, the light guide plate 120 and the optical film 130 are easily and firmly fixed in the accommodation space. It is notified that the light guide plate 120 and the optical film 130 can be fixed in other proper methods.

The inclined blocks 150 are respectively arranged on the upper surfaces of the two sideboards of the frame 140 opposite to each other. However, the arrangement of the inclined blocks 150 is not limited by the present disclosure. For example, four inclined blocks 150 are arranged on the upper surfaces of the sideboards of the frame 140, respectively. The function of the inclined block 150 and the structure of the inclined block 150 will be detailed right now. To begin with, the structure of the inclined block 150 is introduced.

Preferably, the bottom of the inclined block 150 is shaped as a triangular prism, which is a right triangle to facilitate processing and to save cost and time. One leg surface of the inclined block 150 is arranged on the upper surface of the frame 140, and the other leg surface of the inclined block 150 is parallel to an outer lateral side of the frame 140 (or on the same plane). The first slant 151 of the inclined block 150 is a plane. The first slant 151 of the inclined block 150 is connected to the upper surface of the frame 140 smoothly.

It is understood that the inclined block 150 can be shaped arbitrarily as long as the shape of the inclined block 150 is proper so that the glue can be attached more widely and that the glue can be connected to the upper surface of the frame 140 smoothly.

Further, the junction of the outer lateral side of the frame 140 and the upper surface of the frame 140 bulges as an inclined block 150 when the frame 140 is injected and molded with a newly designed frame mold. In other words, the inclined block 150 and the frame 140 are integrated so that the inclined block 150 and the frame 140 can be formed at the same time. Therefore, time-saving and energy-saving is achieved.

Figure 3:
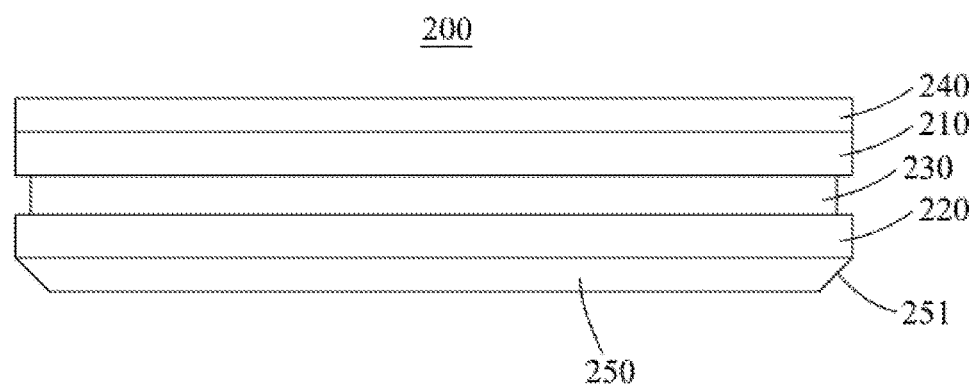
FIG. 3 is a schematic diagram of the structure of a liquid crystal panel (LCD) according to the first embodiment of the present disclosure.

FIG. 3 is a schematic diagram of the structure of a liquid crystal panel (LCD) according to the first embodiment of the present disclosure.

As FIG. 3 shows, the liquid crystal panel 200 includes an upper display substrate (also called "color filter substrate") 210, a lower display substrate (also called "array substrate") 220, a liquid crystal layer 230, an upper polarizer 240, and a lower polarizer 250. It is understood that the liquid crystal panel 200 may further include other key components such as a frame configured to seal the liquid crystal layer 230 between the upper display substrate 210 and the lower display substrate 220, a driver, etc. in this embodiment of the present disclosure.

The upper display substrate 210 and the lower display substrate 220 are correspondingly arranged. The liquid crystal layer 230 is inserted between the upper display substrate 210 and the lower display substrate 220. The liquid crystal layer 230 includes liquid crystal molecules. The upper polarizer 240 is attached to the upper surface of the upper display substrate 210; that is, the upper polarizer 240 is attached to a surface of the upper display substrate 210 back to back with the lower display substrate 220. The lower polarizer 250 is attached to the lower surface of the lower display substrate 220; that is, the lower polarizer 250 is attached to a surface of the lower display substrate 220 back to back with the upper display substrate 210.

A second slant 251 is formed at the junction of the lower surface of the lower polarizer 250 and the lateral surface of the lower polarizer 250. The second slant 251 is a plane. The function of the plane is detailed as follows. In addition, a second slant 251 is formed at the junction of the lower surface of the lower polarizer 250 and a left lateral surface of the lower polarizer 250 and of the lower polarizer 250 and a right lateral surface of the lower polarizer 250 opposite the left lateral surface of the lower polarizer 250 in this embodiment though the arrangement of the second slant 251 is not limited by the present disclosure. Further, a second slant 251 is formed at the junction of the lower surface of the lower polarizer 250 and a front lateral surface of the lower polarizer 250 and of the lower polarizer 250 and a back lateral surface of the lower polarizer 250 opposite the front lateral surface of the lower polarizer 250. In this way, four second slants 251 are formed.

Figure 4:
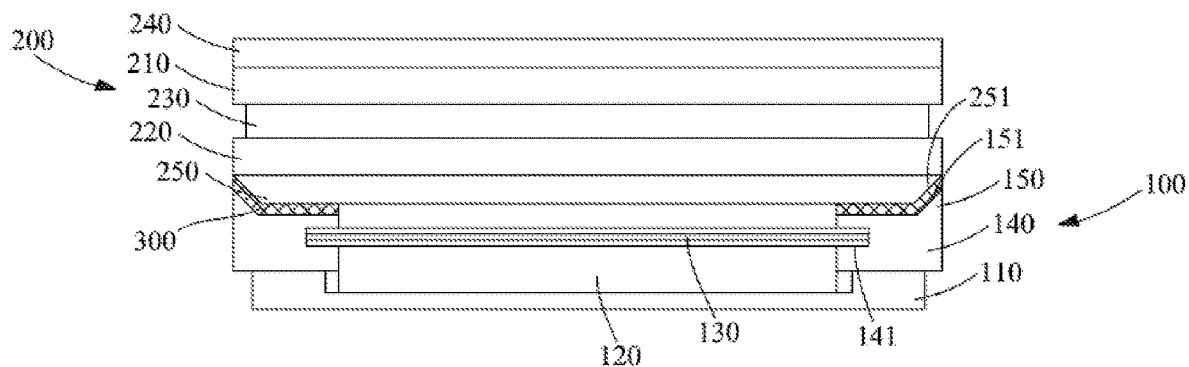
FIG. 4 is a schematic diagram of the structure of the liquid crystal panel (LCD) according to the first embodiment of the present disclosure.

FIG. 4 is a schematic diagram of the structure of the liquid crystal panel (LCD) according to the first embodiment of the present disclosure.

Please refer to FIG. 4. The LCD includes the backlight module 100 as shown in FIG. 1 and FIG. 2 and the liquid crystal panel 200 as shown in FIG. 3. The liquid crystal panel 200 and the backlight module 100 are assembled. Therefore, the lower polarizer 250 is directly arranged on the upper surface of the frame 140.

The liquid crystal panel 200 is arranged on the backlight module 100. The lower polarizer 250 is directly arranged on the upper surface of the frame 140. The second slant 251 on the lower polarizer 250 and the first slant 151 on the inclined block 150 fit correspondingly.

The glue 300 is arranged between the second slant 251 on the lower polarizer 250 and the first slant 151 on the inclined block 150. Also, the glue 300 is arranged between the lower surface of the lower polarizer 250 and the upper surface of the frame 140. Because of the arrangement of the second slant 251 and the first slant 151, the glue 300 having great width can be attached well. It is really helpful to process and assemble the glue 300.

Figure 5:
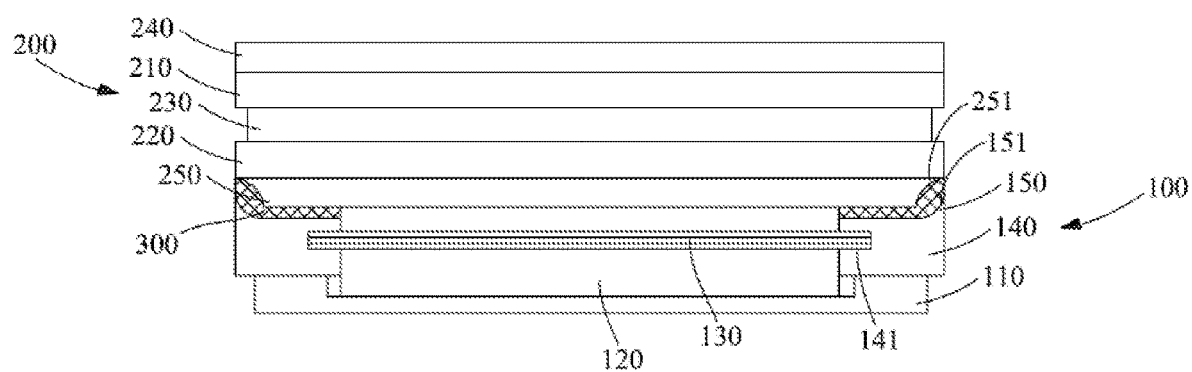
FIG. 5 is a schematic diagram of the structure of a liquid crystal panel (LCD) according to a second embodiment of the present disclosure.

FIG. 5 is a schematic diagram of the structure of a liquid crystal panel (LCD) according to a second embodiment of the present disclosure.

As shown in FIG. 5, differing from the above-mentioned LCD, a second slant 251 on a lower polarizer 250 and a first slant 151 on an inclined block 150 both form a curve, and the curves fit correspondingly. For example, the second slant 251 has a convex shape and the first slant 151 has a concave shape in this embodiment. In another embodiment, a second slant 251 has a concave shape and a first slant 151 has a convex shape; that is, the second slant 251 is mated with the first slant 151.

Consequently, the backlight module and the LCD including the backlight module proposed by the present disclosure supply the glue with wide and broad attaching space. It brings great convenience to processing and assembly of the glue, thereby saving time and costs.

Above are embodiments of the present invention, which does not limit the scope of the present invention. Any modifications, equivalent replacements or improvements within the spirit and principles of the embodiment described above should be covered by the protected scope of the invention.

What is claimed is:

1. A liquid crystal display, comprising:
    a backlight module comprising:
        a backboard;
        a light guide plate, arranged on the backboard;
        an optical film, arranged on the light guide plate;
        a frame, fixed with the backboard and configured to fix the light guide plate and the optical film, wherein an inner lateral side of the frame comprises a groove and a lateral side of the optical film is accommodated in the groove such that an upper surface and a lower surface of the optical film substantially contact the groove; and
        an inclined block, arranged on an upper surface of the frame; wherein a first slant of the inclined block is smoothly connected to the upper surface of the frame; and
    a liquid crystal panel comprising:
        an upper display substrate;
        a lower display substrate, arranged with the upper display substrate;
        an upper polarizer, arranged on an upper surface of the upper display substrate; and
        a lower polarizer, arranged on a lower surface of the lower display substrate and the upper surface of the frame, wherein a second slant is formed at a junction of the lower surface of the lower polarizer and a lateral surface of the lower polarizer, and the second slant and the first slant fit correspondingly.

2. The liquid crystal display of claim 1, wherein a bottom of the inclined block is shaped as a triangular prism as a right triangle; one leg surface of the inclined block is arranged on the upper surface of the frame; the other leg surface of the inclined block is parallel to an outer lateral side of the frame; the slant of the inclined block is a plane.

3. The liquid crystal display of claim 2, wherein glue is arranged between the first slant and the second slant and between the lower surface of the lower polarizer and the upper surface of the frame.

4. The liquid crystal display of claim 1, wherein a bottom of the inclined block is shaped as a quasi-triangular prism as a quasi-right triangle; two right-angle sides of the quasi-right triangle are straight edges; a hypotenuse of the quasi-right triangle is a curve edge; one leg surface of the inclined block is arranged on the upper surface of the frame; the other leg surface of the inclined block is parallel to an outer lateral side of the frame; the slant of the inclined block is a curve.

5. The liquid crystal display of claim 4, wherein glue is arranged between the first slant and the second slant and between the lower surface of the lower polarizer and the upper surface of the frame.

6. The liquid crystal display of claim 1, wherein the inclined block and the frame are integrated.

7. The liquid crystal display of claim 6, wherein glue is arranged between the first slant and the second slant and between the lower surface of the lower polarizer and the upper surface of the frame.

8. The liquid crystal display of claim 1, wherein glue is arranged between the first slant and the second slant and between the lower surface of the lower polarizer and the upper surface of the frame.

* * * * *